US012686228B2

(12) United States Patent
Boyce et al.

(10) Patent No.: US 12,686,228 B2
(45) Date of Patent: Jul. 21, 2026

(54) MULTI-PIECE LID FOR PAINT PAILS AND OTHER PAIL SHAPED CONTAINERS

(71) Applicants: David James Boyce, Calgary (CA); Salah Sukareye, Chestermere (CA)

(72) Inventors: David James Boyce, Calgary (CA); Salah Sukareye, Chestermere (CA); Hongqiao Li, Edmonton (CA)

(73) Assignees: David James Boyce, Calgary (CA); Salah Sukareye, Calgary (CA)

( * ) Notice: Subject to any disclaimer, the term of this patent is extended or adjusted under 35 U.S.C. 154(b) by 201 days.

(21) Appl. No.: 18/627,087

(22) Filed: Apr. 4, 2024

(65) Prior Publication Data

US 2025/0313036 A1 Oct. 9, 2025

(51) Int. Cl.
*B44D 3/12* (2006.01)
*B65D 21/02* (2006.01)
*B65D 43/02* (2006.01)

(52) U.S. Cl.
CPC ......... *B44D 3/127* (2013.01); *B65D 21/0219* (2013.01); *B65D 43/0212* (2013.01)

(58) Field of Classification Search
CPC ................ B44D 3/127; B65D 21/0219; B65D 43/0212; B65D 45/16; B65D 47/12
USPC ...... 220/254.1, 254.9, 258.2, 276, 315, 324, 220/326, 345.2, 345.4, 784
See application file for complete search history.

(56) References Cited

U.S. PATENT DOCUMENTS 3,005,571 A * 10/1961 Hall ...................... E05C 19/066 220/254.3
3,151,765 A * 10/1964 Griese, Jr. .......... B65D 17/4011 220/269
3,531,013 A * 9/1970 Wilhelm ............ B65D 43/0208 220/792
4,000,830 A * 1/1977 French .................... A47J 36/06 220/361
4,079,857 A * 3/1978 Crisci ................ B65D 43/0212 206/508

(Continued)

FOREIGN PATENT DOCUMENTS

CN 208693092 U * 4/2019

OTHER PUBLICATIONS

English translation of CN 208693092 provided by Espacenet. (Year: 2025).*

*Primary Examiner* — James N Smalley

(74) *Attorney, Agent, or Firm* — Kyle R Satterwaite; Ryan W Dupuis; Ade & Company Inc.

(57) ABSTRACT

A multi-piece pail lid features a mounting base having an outer rim matable to the container, and a recessed center wall bound by the mounting rim and embodying at least one opening for introduction or pouring of a pourable medium to or from the pail. A separate removable cover is selectively engageable to the mounting base in a closed position seated atop the recessed center wall and closing the hole(s) therein. An inside of the mounting rim, at one half thereof, is undercut to accept angulated insertion of a perimeter margin of the cover, and holding clips on the other half are usable to lock the cover in place once inserted to, and laid flat on, the mounting base. The recessed center wall of the mounting base is reinforced to allow pail stacking and the clip-held closure of the cover has sufficient strength for use of vacuum palletizers thereon.

24 Claims, 5 Drawing Sheets

(56) References Cited

U.S. PATENT DOCUMENTS

| | | | | | |
|---|---|---|---|---|---|
| 5,059,319 | A * | 10/1991 | Welsh | B01D 29/01 210/232 |
| 5,120,454 | A * | 6/1992 | Wieties | B01D 29/03 210/162 |
| 5,725,122 | A * | 3/1998 | Murphy | B65D 43/0212 206/508 |
| 11,446,956 | B1 * | 9/2022 | Boyce | B65D 51/20 |
| 2011/0095040 | A1 * | 4/2011 | Onken, Jr. | B65F 1/10 220/819 |

* cited by examiner

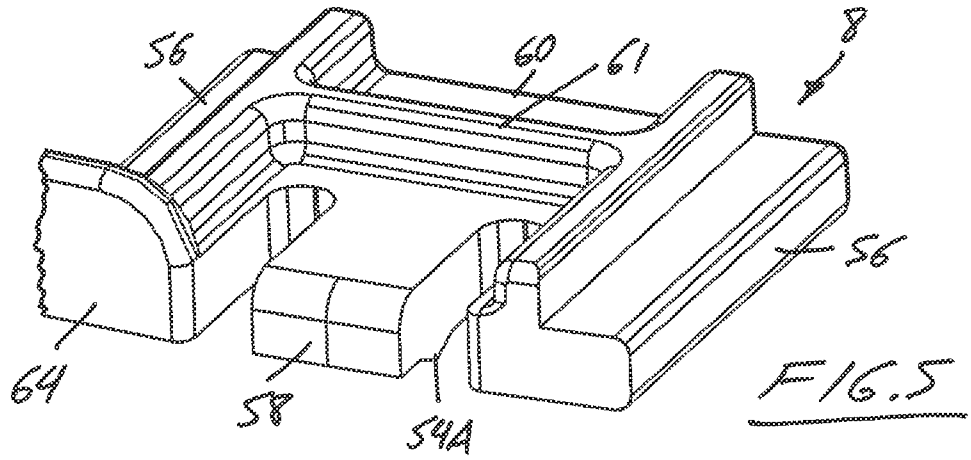
FIG. 5
FIG. 6
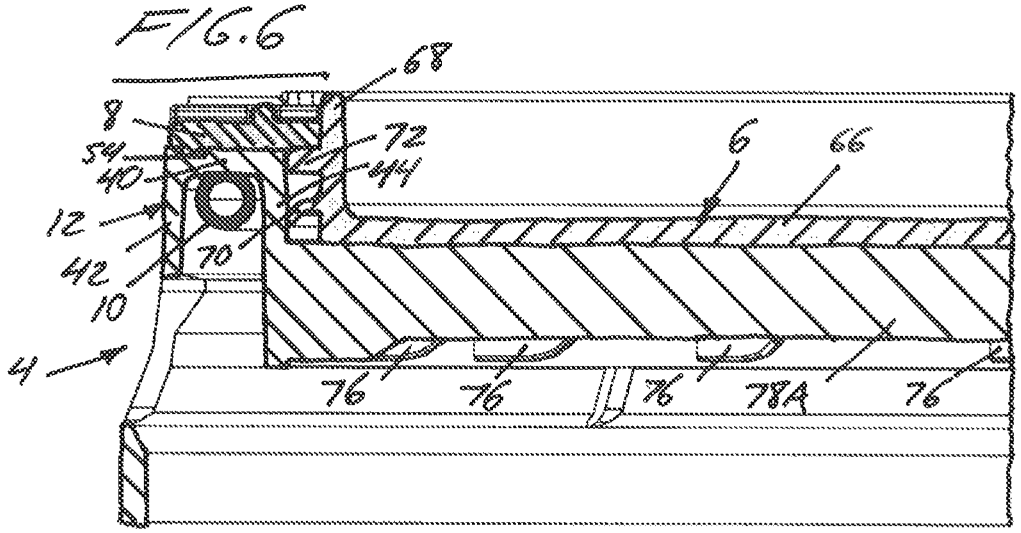
FIG. 7
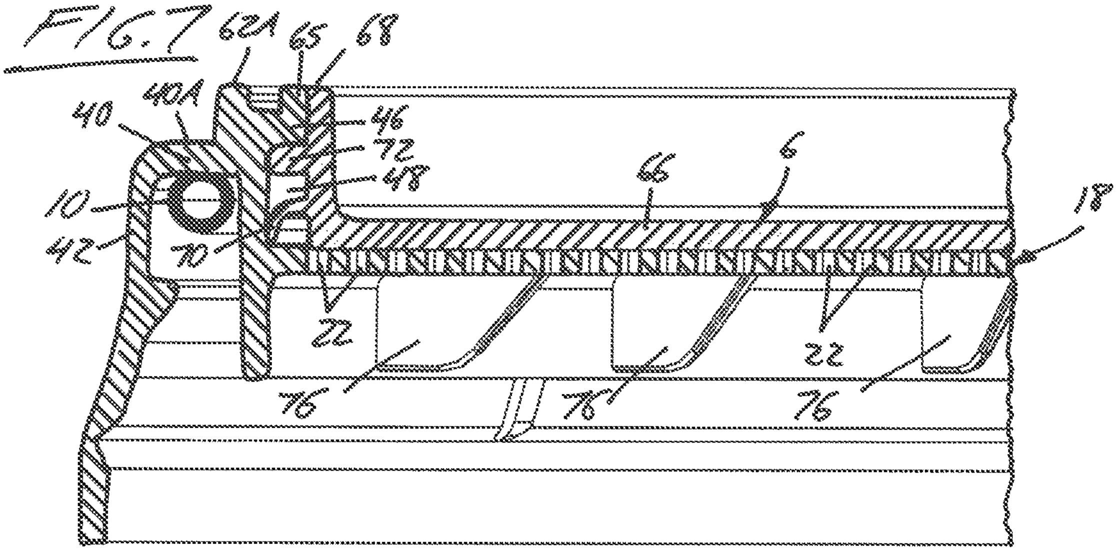

MULTI-PIECE LID FOR PAINT PAILS AND OTHER PAIL SHAPED CONTAINERS

FIELD OF THE INVENTION

This application relates generally to containers, and more particularly to lids and straining devices for paint containers.

BACKGROUND

In the field of paint products, there have been numerous prior designs for paint straining products that attach to the rim of a paint can and provide a perforated screen or mesh-like strainer body through which paint can be poured form the can in manner removing impurities (clumps, dirt, dust, dried flakes, etc.) from the poured paint. Examples of such products can be seen in prior U.S. Pat. Nos. 1,959,584, 2,471,189, 2,606,694, 2,849,158, 3,081,912, 4,240,568, 5,078,872, U.S. D254482 and U.S. D846822. Despite these prior paint straining proposals, there remained room for an improved solution for optimally convenient straining of paint during poured dispensing thereof from a paint container, in response to which applicant developed the uniquely combined lid and strainer device shown in Applicant's prior U.S. Pat. No. 11,446,956, the entirety of which is incorporated herein by reference. That patented design featured a hinged cover on a rim-mounted strainer for a paint pail, so that the rim-mounted strainer defined a fully closed lid of the pail when the hinged cover was closed. Challenges remained however, for example as to whether the snap-fit closure proposed for the hinged cover could provide sufficient strength to withstand lifting of the paint by a vacuum palletizer.

Owing to this and other challenges, Applicant has continued to make further developments in this field of endeavour, and herein discloses a novel multi-piece lid design usable on paint pails, and any other variety of similarly pail shaped containers.

SUMMARY OF THE INVENTION

According to one aspect of the invention, there is provided a multi-piece lid device for a pail-shaped container, said device comprising:

- a mounting base for securement to the pail-shaped container at a top rim thereof, said mounting base comprising an outer mounting rim of downwardly-opening channel-shaped configuration for mated fitting over said top rim of the paint container, said outer mounting rim spanning around a recessed center wall of the mounting base that is of recessed elevation relative to a topside of said outer rim;
- at least one opening that penetrates through said recessed center wall and through which a pourable medium is introducible into, or pourable from, the pail-type container in an installed state of the mounting base thereon; and
- a removable cover embodied separately of the mounting base and selectively engageable thereto in a closed position seated atop the recessed center wall in closed relation over the at least open opening therein, and removable from the mounting base to re-open said at least one opening.

Preferably the outer mounting rim of the mounting base, at an inner side thereof, comprises at least one undercut region embodying a respective undercut and a respective overhang jutting inwardly thereover, of which said respective undercut is arranged to receive an outer peripheral margin of the removable cover to facilitate the closed position thereof, and said respective overhang is arranged to block lifting of said outer peripheral margin of the removable cover from said respective undercut.

Preferably the mounting base further comprises at least one movable cover holder movable between a holding position for holding the removable cover in the closed position, and a release position permitting removal of the removable cover.

Preferably a location of said at least one undercut region of the outer mounting rim resides within a first arcuate half of the outer mounting rim and the mounting base at least one movable cover holder resides at a location residing within an opposing second arcuate half of the mounting rim.

Preferably said holding position of the movable cover holder protrudes inwardly beyond an inside wall of the outer mounting rim to overlay a peripheral outer margin of the removable cover in the closed position thereof, and thereby block lifting of the removable cover from the recessed center wall of the mounting base.

Preferably the release position of each movable cover holder is of non-protrusive relation to the inside wall of the outer mounting rim.

Preferably each movable cover holder resides atop the outer mounting rim.

Preferably the mounting base comprises one or more raised crush preventers thereon of greater elevation than the at least one movable cover holder to prevent damage thereto.

Preferably there are plurality of cover holders at spaced positions along the mounting rim.

Preferably at least one of the one or more raised crush preventers resides between an adjacent pair of the cover holders.

Preferably said plurality of cover holders are interconnected to one another.

Preferably each movable cover holder comprises a movable holding clip having a first snap feature thereon that, in the holding position, engages with a second snap feature on the mounting rim to hold the movable cover holder in the holding position.

Preferably said first and second snap features comprise a protrusive male snap feature on a first one of either the movable cover holder or the mounting rim, and a cooperatively female snap feature on a second one of either the movable cover or the mounting rim.

Preferably the protrusive male snap feature resides on an underside of the holding clip, and the female snap features is recessed in a topside of the mounting rim In at least some embodiments, the least one hole in the recessed center wall of the mounting base comprises an array of straining holes distributed throughout at least part of the center wall to define a strainer through which the pourable medium is strainable during pouring thereof from the pail-shaped container through said straining holes when the removable cover is removed.

In such embodiments, preferably the at least one hole further comprises an additional hole of larger size that the straining holes.

In some embodiments, the removable cover is of unperforated character lacking any holes or ports therein.

Preferably the removable cover comprises at least one tab or handle of outwardly protrusive relationship to a round majority of the cover that occupies the recessed center wall of the mounting base in the closed position.

Preferably there is a seal positioned to reside in externally circumferential relationship to the removable cover and internally circumferential relationship to the outer mounting rim of the mounting base in sealing contact with both thereof in the closed position of the removable cover.

Preferably the seal comprises a flexible sealing fin embodied on a respective one of either an outside of removable cover or an inside of the outer mounting rim of the mounting base.

Preferably the mounting base comprises one or more elongated stiffening ribs spanning at least partially across an underside of the recessed center wall to increase a weight-bearing capacity thereof in stacked receipt of another pail-shaped container atop the multi-piece lid device.

Preferably the one or more elongated stiffening ribs comprises a plurality of stiffening ribs, which ribs may intersect one another at a junction of convexly bulbous relation to the underside of the recessed center wall.

Preferably the removable cover comprises an upstanding cylindrical wall at a topside thereof that spans circumferentially around the removable cover in proximity to an outermost perimeter thereof.

Preferably said upstanding cylindrical wall is offset a short distance inwardly from said outermost perimeter thereof to leave an outer peripheral margin of the removable cover exposed outside said upstanding cylindrical wall.

BRIEF DESCRIPTION OF THE DRAWINGS

Preferred embodiments of the invention will now be described in conjunction with the accompanying drawings in which:

FIG. 5 is a top perspective view, in closeup, of one of the interconnected cover holding clips of FIG. 2, in isolation.

FIG. 6 is a partial cross-sectional view of the fully assembled multi-piece lid of FIG. 1, as would be seen along line A-A of FIG. 2.

FIG. 7 is another partial cross-sectional view of the fully assembled multi-piece lid of FIG. 1, but as would be seen along line B-B of FIG. 2.

DETAILED DESCRIPTION

Figure 1:
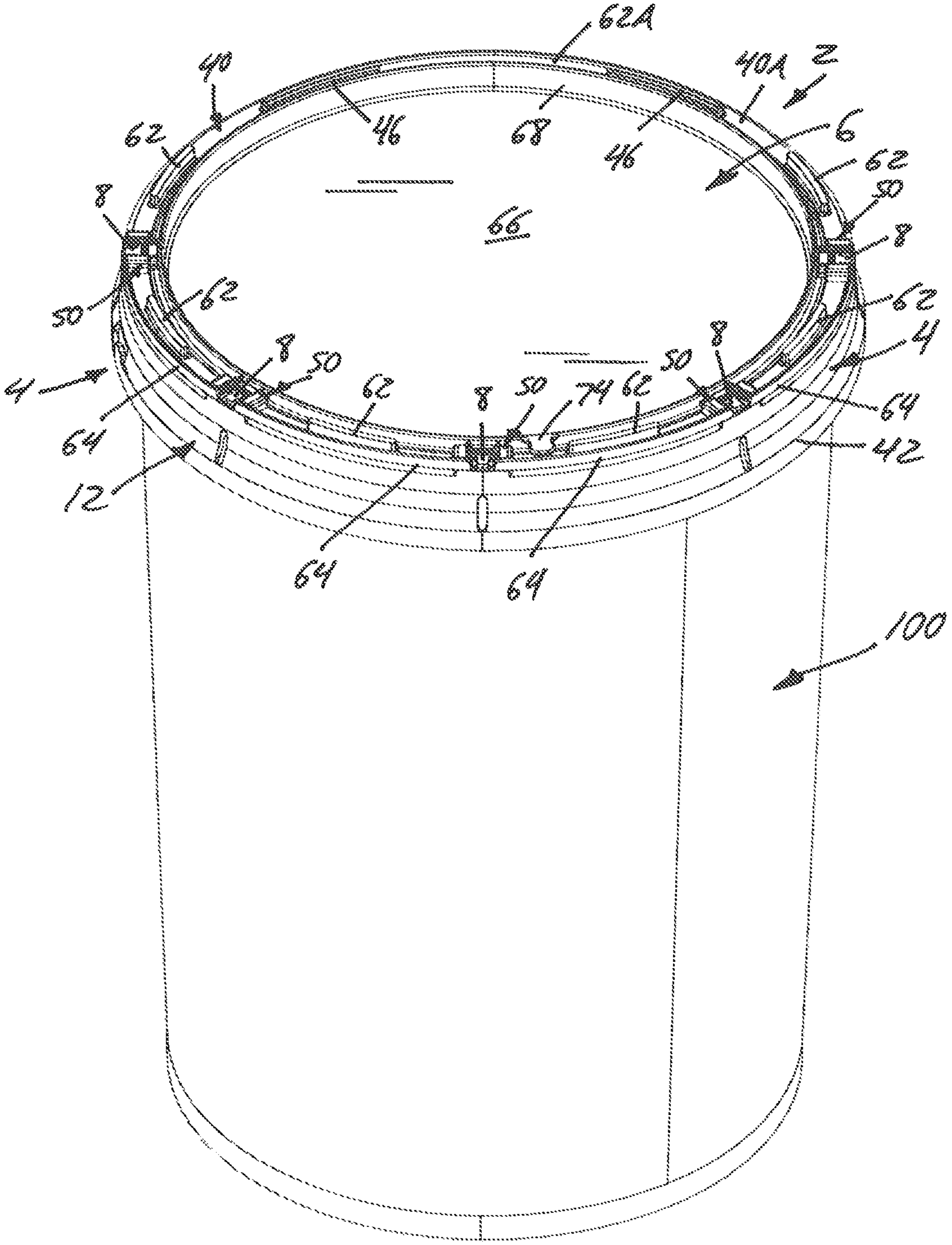
FIG. 1 is a perspective view of a paint pail equipped with a novel multi-piece lid of the present invention, which is shown in an installed and fully assembled state closing off the top end of the paint pail.

Referring initially to FIG. 1, a first embodiment of a multi-piece, strainer-equipped lid device 2 for a paint pail 100 or other pail shaped container is shown in a fully assembled and installed condition atop the paint pail 100 to effectively close off the otherwise open top end of the pail 100. Referring to the exploded view of FIG. 2, the constituent parts multi-piece lid device 2 of the illustrated embodiment (also referrable to herein simply as simply "the device" or "the lid", for brevity) include a mounting base 4 that attaches to a top rim 102 of the paint pail 100, a removable cover 6 embodied separately of the mounting base 4 and selectively engageable thereto in a closed position cooperating therewith to close off the top opening of the paint pail 100, a set of holding clips 8 for installation on the mounting base 4 in a manner each selectively movable between a holding position holding the removable cover 6 in place on the mounting base 4 and a release position permitting removal of the removable cover therefrom, and a large o-ring 10 for sandwiched receipt between the mounting base 4 and the top rim 102 of the paint pail 100 to provide a fluid tight seal therebetween around the entirety of the top rim, and thus entirely around the top opening of the paint pail that is delimited by the top rim 102 thereof.

The mounting base 4 has a circular outer mounting rim 12 configured for mated fitting onto a top rim of the paint pail 100, for example a standard 5-gallon paint pail, though it will be appreciated that any of the various design aspects of the device 2 may incorporated into lids for other pail shaped containers of various sizes used for storing various pourable mediums, whether liquid or granular. The mounting rim 12 surrounds a circular inner area 14 of the mounting base 4. As shown, a singular relatively large opening 16 penetrates vertically through the mounting base 4 at a horizontally oriented and circularly shaped center wall 18 of the mounting base 4 that resides in a plane normal to a central vertical axis 19 around which the mounting rim 12 is centered. This circular center wall 18 occupies the entirety of the circular area 14 bound by the surrounding mounting rim 12, and is affixed thereto around an entire internal circumference of the mounting rim 12, preferably in seamlessly integral relation thereto as part of a unitarily molded plastic resin body that embodies the entirety of the mounting base 4 in the illustrated example.

It will be appreciated that any use of the terms horizontal and vertical herein are being used in relation to a standard orientation in which the lid device 2 would reside when installed on the top rim 102 of the paint pail 100, when such paint pail 100 is seated on the ground or other horizontal surface. In the assembled and installed state of the lid device 2 atop the pail 100, the mounting base 4, the removable cover 6 and the pail 100 are all centered on the same central vertical axis 19, as can be seen in the exploded view of FIG. 2. In use of the lid device 2, the mounting base 4 will normally remain in place on the top rim 102 of the paint pail 100 once initially installed, typically by a paint manufacturer or distributor. In contrast, the removable cover 6 is selectively removed from the mounting base 4 whenever needed. One such motivation for removal of the cover 6 is to enable addition of a tinting agent to an untinted base paint inside the pail 100 during custom tinting of the paint for a customer by a retailer or other paint preparer. Another motivation for removal of the cover 6 is for pouring of the paint from the pail 100 by the painter when it comes time for consumptive use of the paint. When the removable cover 6 is removed from the mounting base 4, the relatively large opening 16 in the center wall 18 of the mounting base can be used for such addition of the tinting agent during preparation of the paint for a customer. The relatively large opening 16 can likewise be used for similar introduction of any variety of additives to existing contents of an already occupied pail 100 of varying product content, and can optionally also be used for the purpose of initial filling of a pail on which the mounting base 4 was installed prior to such filling, though in practice it is typically anticipated that the mounting base 4 will be first installed after initial filling of the pail 100.

In the illustrated embodiment, the center wall 18, in addition to the relatively large opening 16, also features a strainer 20 integrally embodied therein as an array of straining holes 22 of dramatically smaller size than the comparatively large opening 16. The large opening 16 resides radially outward from the center point of the center wall 18 (i.e. from central axis 19), and, at least in the illustrated example, has a diameter whose measure is less than half of an overall diameter of the center wall 18. The large opening 16 thus resides entirely to one side of a diametric reference line denoted by cross-sectional line A-A of FIG. 2, and therefore occupies only one of two semi-circular halves of the center wall 18 that reside on respective side of this diametric reference line A-A. In the illustrated example, the array of smaller straining holes 22 occupies a substantial entirety of the other semi-circular half of the center wall 18, which half, at least in the illustrated example, only lacks such straining holes 22 at a narrow outer marginal strip 24 of adjacent relation to an inside of the outer mounting rim 12, at a radial strip 26 that perpendicularly intersects the diametric reference line A-A at the center point of the central wall 18 and spans radially out therefrom to the arcuate marginal strip 24, at a diametric strip 28 that lies on the diametric reference line A-A, at a series of small radial strips 30 jutting a short distance radially inward from the marginal strip 24 at spaced intervals therealong, and at a central dimple 32 concavely recessed in the topside of the center wall 18 where the radial and diametric strips 26, 28 intersect at the central axis 19. Each of the unperforated strips and center dimple 24, 26, 28, 30, 32 that are unoccupied by the straining holes 22 corresponds to a bottom-reinforced area of the center wall 18, as will become more apparent further below with reference to FIG. 4, where the unperforated character of the center wall 18 is needed to make solid connection to such underside reinforcements.

In the illustrated example, the second semi-circular half of the center wall 18 occupied by the larger opening 16 on the opposing side of the diametric reference line A-A is also occupied by a subset of the straining holes 22, albeit a lesser quantity thereof occupying a lesser collective area than those on the more perforated side that defines a majority of the strainer 20. In the illustrated example, this smaller subset of the straining holes 22 occupies only about half of a radial measure of this semi-circular half of the center wall 18, which radial measure in this instance is measured from the center point of the center wall 18 to the outer rim 12 thereof through a center point of the large opening 16. This less perforated half of the center wall is unperforated over its outer half of that radial measure, and is also unperforated at extensions of the marginal strip 24 of the more perforated half, at another few small radial strips 30 radiating inward from these extensions of the marginal strip 24, and at an inner marginal strip 34 that arcs around the large opening 16 at the side thereof nearest the center of the center wall 18. In preferred embodiments, the small straining holes 20 are preferably round, which avoids or reduces flashing during plastic resin molding compared to square straining holes 20 that may flash over, particular after significant repetitional use of an injection mold.

In embodiments with the straining holes 20, these smaller straining holes 20 are used to pour paint or other pail contents from the pail 20 by tipping the pail downward in a directionality corresponding to the more perforated half of the mounting base. Other embodiments for applications that don't require a straining function however may optionally omit the straining holes 22 altogether, and may use the larger opening 16 for pouring out of the paint or other pail contents, in which case a pour spout attachment (not shown) may be installed in the large opening 16 any time the cover 6 is removed. While the illustrated cover 6 is an unperforated cover 6 with no openings therein, an alternative embodiment of the cover 6 may have an openable/closeable pouring port therein that is alignable with the large opening 16 of the mounting base 4, and which pouring port can optionally host a pour spout attachment, whereby a painter can choose whether to remove the cover 6 and pour the paint through the revealed strainer 20, or to keep the cover 6 in place, and pour paint from the pail 100 through the pouring port. For example, straining may be unnecessary during first time pouring of a newly purchased paint pail containing only fresh, previously undispensed paint.

The outer mounting rim 12 of the mounting base 4 has a top wall 40, an outside wall 42 depending downward from the top wall 40 an outside edge thereof, and an opposing inside wall 44 depending downward from the top wall 40 an inside edge thereof, whereby the mounting rim 12 is of a downwardly opening channel-shaped configuration for mating over the top rim 102 of the paint pail 100 or other pail shaped container around the circular top opening of such container. As can be seen in the cross-sectional views of FIGS. 6 and 7, the inside of the outside wall 42 is shaped for semi-permanent snap fit engagement with the rim 102 of the pail 100, as will be familiar to those of skill in the art from conventional one-piece paint pail lid. Through engagement of the mounting rim onto the top rim of the paint pail, the circular inner area 14 of the mounting base 4 occupied by the perforated center wall 18 thereof is thereby placed in overlying relation to the paint pail's circular top opening, whereby paint is pourable through the perforated strainer 20 or large opening 16 whenever same are not covered by presence of the removable cover 6. The center wall 18 of the mounting base is integrally affixed to the inside wall 44 of the mounting rim 12 at an elevation thereon downwardly offset from the top wall 40 of the outer mounting rim 12, whereby the center wall 18 resides at a recessed elevation relative to the uppermost surface of the mounting rim 12 (i.e. the topside 40A of the mounting rim's top wall 40).

The mounting rim 12 can be interpreted as having two arcuate halves, each spanning a respectively 180-degrees around the center of the mounting base 4 (i.e. around central axis 19). Each arcuate half of the mounting rim corresponds to a respective one of the more-perforated half of the center wall 18 characterized by the greater quantity of straining holes 20, or the less perforated half characterized by the singular large opening 16. Of these two arcuate halves of the mounting rim 12, one is referred to herein as an insertion half in which an outer margin of the removable cover 6 is first angularly inserted in titled fashion during installation of the removable cover 6 onto the mounting base, and the other half is referred to a locking half where the cover 6 is locked and held in place once angularly inserted and laid flat on the mounting base 4. In the illustrated embodiment, the insertion half of the outer mounting rim 12 corresponds to the more perforated straining half of the center wall 18, and the locking half of the outer mounting rim 12 corresponds to the less perforated half of the center wall 18. In other embodiments, this convention may be reversed, or the paired insertion and locking halves of the mounting rim 12 may be angularly offset relative to the likewise paired halves of the center wall 18, by any relative degree, around the central axis. So, while diametric reference line A-A of FIG. 2 denotes both the boundary between the more and less perforated halves of the center wall 18 and the boundary between the insertion and locking halves of the outer rim 12 in the illustrated embodiment, the boundary between the insertion and locking halves may instead be any diametric reference line of any relative angulation to line A-A.

The insertion half of the outer mounting rim 12 is characterized by at least one undercut region, of which there are two in the illustrated embodiment, each of which is characterized by a respective catch shoulder 46 situated atop the top wall 40 of the outer rim 12, and which catch shoulder 46 juts a short distance inwardly past the inside wall 44 in cantilevered overhanging relation thereto, as best revealed in the cross-sectional view of FIG. 7. The result is the presence of an undercut cavity 48 residing adjacent to the inside wall 44 of the mounting rim 12 beneath the cantilevered overhang of the catch shoulder 46. The two respective catch shoulders 46 of the two undercut regions reside in positions of symmetric relationship to one another across a diametric reference line that is perpendicular to the line A-A and is occupied by unperforated radial strip 26 of the more perforated half of the center wall 18. The catch shoulders 46 each span a respective partial arcuate length of a respective quadrant of the mounting rim 12, and more particularly each partially occupy a respective one of two neighbouring octants of the mounting rim 12. Alternatively, the two catch shoulders 46 could be replaced with a singular catch shoulder of greater arcuate span along the mounting rim, forming a singular and larger undercut cavity rather than two discretely separate undercut cavities 48.

The locking half of the mounting rim 12 lacks any such undercut cavities 48, and is instead characterized by inclusion of a plurality of clip holders 50 residing atop the top wall 40 of the outer mounting rim 12 at spaced apart intervals therelong. In the illustrated embodiment, there are five such clip holders 50 residing at uniformly spaced 45-degree intervals to one another over the 180-degree span of the locking half of the outer mounting rim 12. A diametrically opposing end pair of the clip holders 50 reside diametrically opposite one another at diametric reference line A-A. A middle one of the clip holders 50 resides midway between the end pair on a diametric reference line that is coincident with the unperformed radial strip 26 of the more perforated half of the center wall 18, and that intersects a center point of the large opening 16 therein. A remaining intermediate pair of the clip holders each reside half-way between the middle clip holder and a respective one of the end pair of clip holders, thus residing symmetrically of one another across the diametric reference line on which the middle clip holder resides. In this layout, the middle clip holder 50 lies diametrically opposite of a midpoint between the two catch shoulders 46 on the opposing insertion half of the outer mounting rim 12.

Each clip holder 50 is composed of two upstanding channel walls 52 of symmetric relation to one another across a respective vertical radial plane (not illustrated) emanating radially from the central vertical axis 19 in parallel orientation thereto. Each channel wall, in an vertical plane lying orthogonally to the radial plane and tangentially of the mounting rim 12, has an inverted L-shaped profile, of which a base leg 52A stands vertically upright from the top wall 40 of the mounting rim 12, and a top leg 52B juts horizontally inward from the base leg 52A toward the matching top leg 52B of the other channel wall 52. Each channel wall is horizontally elongated in parallel relation to the respectively radial plane that symmetrically bisects the clip holder 50. The two channel walls 52 of each clip holder thus cooperatively form a slide channel therebetween for sliding receipt therein of a respective one of the cover holding clips 8 in a position ridable atop the top wall 40 of the mounting rim 12 and slidable back and forth thereon, beneath the top legs 52B of the channel walls 52, in a direction of radial relation to the center axis 19, i.e. toward and away from the center of the mounting base 4. Centered between the two channel walls 52 in the sliding channel is a female snap slot 54 recessed into the topside 40A of the outer mounting rim 12 near the outside wall 42 thereof.

Each cover holding clip is generally m-shaped in top plan view, having a pair of outer legs 56 each of which is vertically constrained between the topside 40A of the outer mounting rim 12 and the top leg 52B of a respective one of the channel walls 52 of the respective clip holder 50, and can slide radially back and forth in this constrained space therebetween. A middle leg 58 of the m-shaped cover holding clip 8 is parallel to the outer legs 56 thereof, and on its underside, has a male snap tang 54A of aligned relation to the female snap slot 54 in the sliding channel so that the male snap tang 54A will snap into and out of the female snap slot 54 when the holding clip 8 is slid radially back and forth in the sliding channel between the channel walls 52 of the clip holder 50. A cross-bar 60 of the m-shaped cover holding clip 8 interconnects the three legs 56, 58 thereof at an inner end of the holding clip 8 that points toward the center of the mounting base 4.

Inside the slide channel of its respective clip holder 50, each holding clip 8 is slidable radially inward to a holding position, in which the inner end of the holding clip 8 overhangs inwardly from the top wall 40 of the mounting rim 12 past the inside wall 44 thereof to hold the removable cover 6 in place atop the center wall 18 of the mounting base 4 when seated thereon. Each holding clip 8 is also slidable radially outward to a release position of non-overhanging relation to the inside wall 44 of the mounting rim, and thus of non-overlying relationship to the removable cover 6 to allow lifting thereof from off the center wall 18 of the mounting base 4. In the holding position, the male snap tang 54A of the clip 8 engages in the female snap slot 54 of the mounting rim 12 so as to self-retain this holding position, until application of a sufficient user-applied radially-outward pulling force to forcibly ride the tang 54A out of the snap slot 54 via momentary upward deflection of the clip's middle leg 58. Once the tang 54A clears the outside wall 42 of the outer mounting rim 12, this denotes the release position of the holding clip 8, under which the clip's middle leg 58 will return to its normal undeflected state, whereby the snap tang 54A now hooks over the outside of the mounting rim 12.

Figure 2:
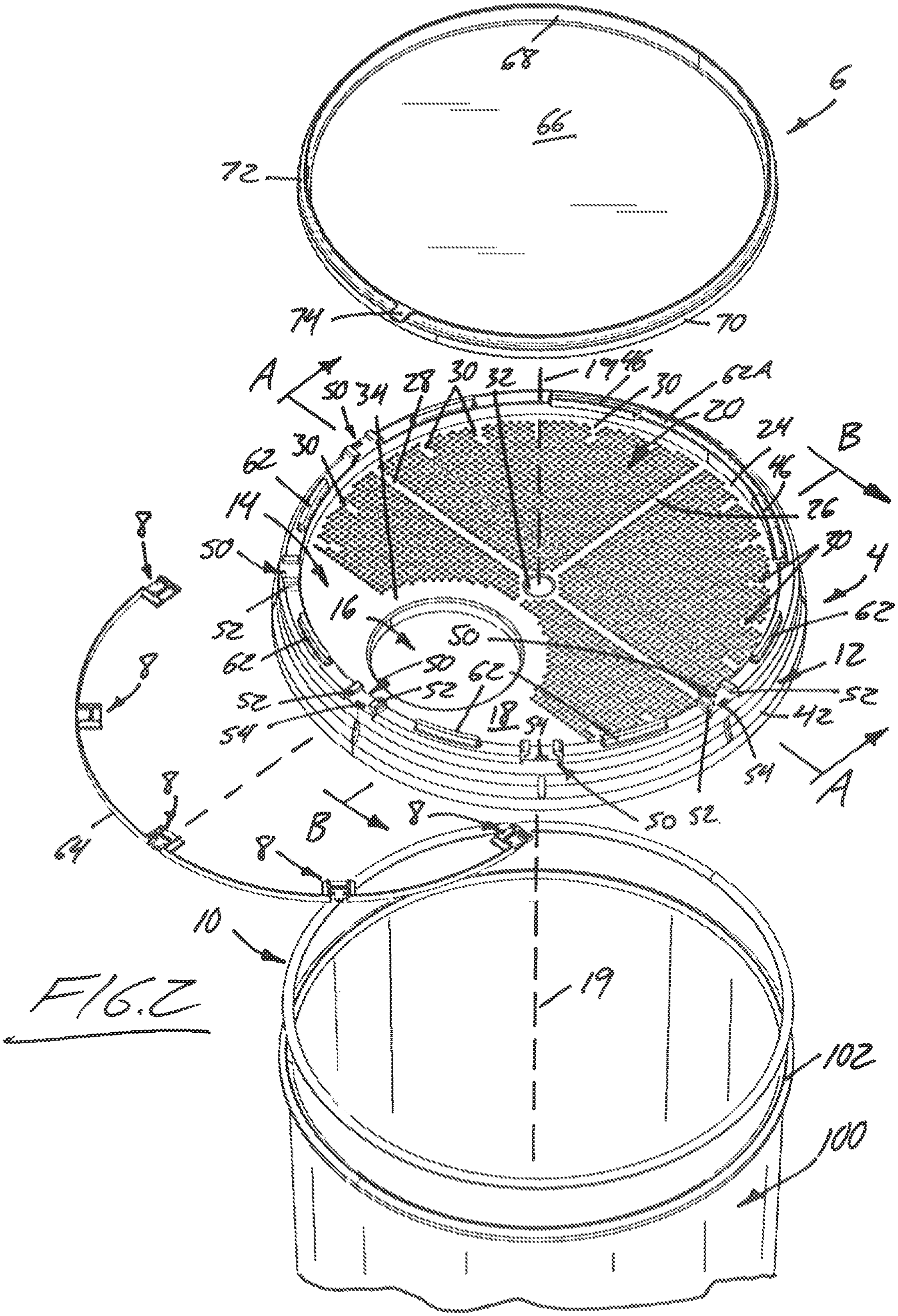
FIG. 2 is an exploded top perspective view of the paint pail and multi-piece lid of FIG. 1, illustrating a strainer-equipped mounting base for mounting atop a rim of the paint pail, a separate cover engageable to the mounting base in a closed position effectively closing the paint pail, and an interconnected set of holding clips for selective holding of the cover in the closed position.
Figure 3:
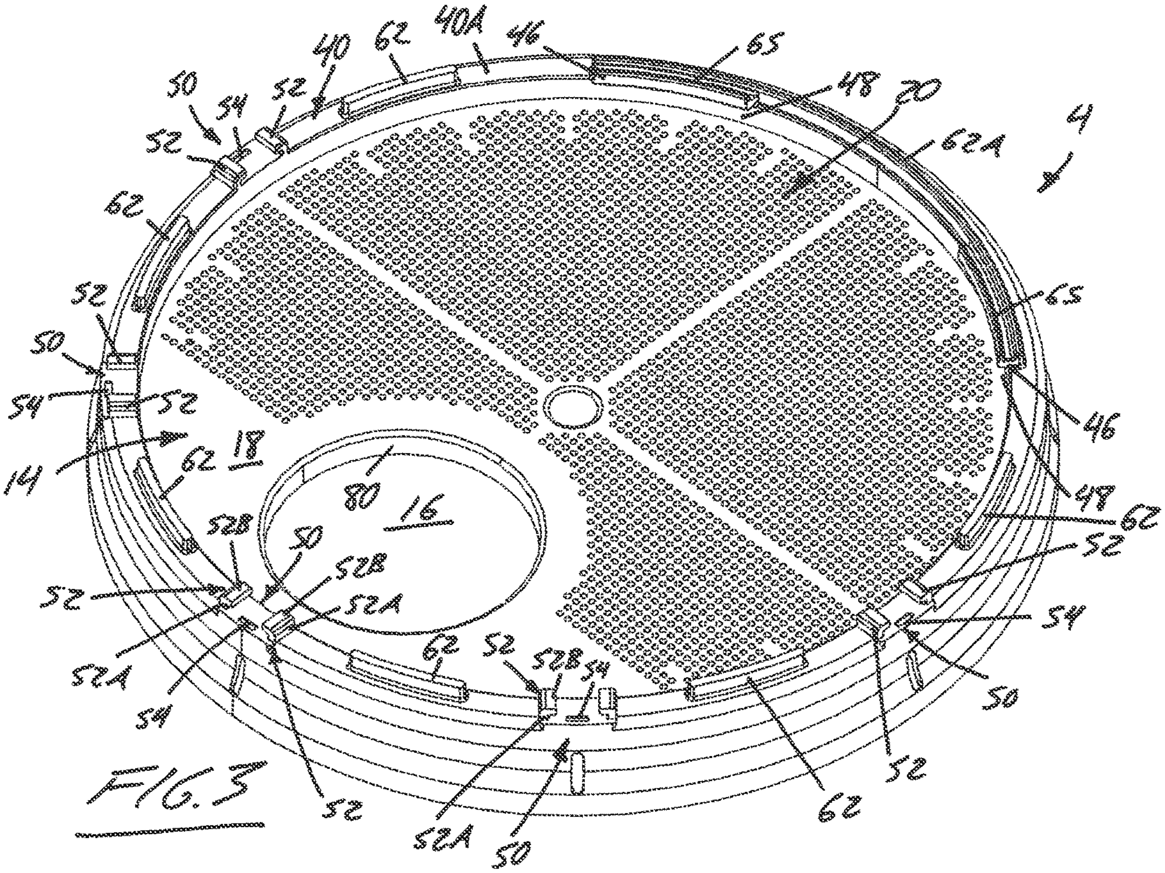
FIG. 3 is a top perspective view of the mounting base of FIG. 2, in isolation.

To move the holding clip 8 back into the holding position to once again lock the removable cover 6 in place atop the mounting base, a user-applied radially inward pushing force is applied to the holding clip 8 to forcibly ride the snap tang 54A up over the outside top corner of the outer rim (where the top wall 40 and outside wall 42 thereof meet), and back into the female snap slot 54. For such user-forced manipulation of each holding clip 8, a topside thereof is formed with a raised finger-grip ridge 61 spanning across the clip 8 for finger-tip actuated pushing and pulling thereof in the open space between the in-turned top legs 52B of the two channel walls 52 of the clip holder 50. As shown in FIG. 2, the plurality of holding clips 8 may be interconnected to one another via an elongated clip joiner 64, preferably in the form of an integrally molded thin strip or band of plastic resin that is molded unitarily with the holding clips 8. Inclusion of such clip joiner 64 helps prevent inadvertent loss or misplacement of clips 8, and helps with alignment of the clips 8 with their respective clip holders 50 during initial assembly of the muti-piece lid 2, though it will be appreciated that separate clips 8 lacking such joined interconnection could instead be used. In the illustrated embodiment, the outer ends of the channel walls 52 of the clip holders are inset slightly inward from the outer surface of the plane of the outside wall 42 of the mounting rim 40 so that the thin clip joiner 64 sits flush with, or slightly inset from, that outer plane of the outside wall 42 when the clips are in their holding position, so that no part of the interconnected clip unit resides outwardly of the mounting rim's outside perimeter, and thus doesn't interfere with nested stacking of multiple mounting base's atop one another, even with the holding clips installed.

Also embodied atop the top wall 40 of the mounting rim 12 at spaced intervals therearound is a set of crush preventers 62, each embodied as a protrusively raised rib that spans a short arcuate segment of the mounting rim 12 and stands taller than the channel walls 52 of each clip holder 50. In the illustrated example, there are four crush preventers 62 on the locking side of the mounting base 4, each being situated between each neighbouring two of the clip holders 50, plus two additional crush preventers 62 on the insertion side of the mounting base 4, each situated between a respective end one of the clip holders 50 and the nearest catch shoulder 46. In addition to this set of relatively short crush preventers 62 interspersed between the clip holders 50 and the catch shoulders 46, another longer crush preventer 62A spans a longer arcuate segment of the rim at the insertion side of the mounting base 4, and specifically spans a full length of each catch shoulder 46 at an outer side thereof, and also spans the entirety of the distance between the two catch shoulders 46. The crush preventers 62, 62A are all of matching height in their upstanding relationship to the top wall 40 of the outer mounting rim 12, so that the top ends of all the crush preventers 62, 62A are coplanar with one another at an elevation exceeding those of both the channel walls 52 of the clip holders 50 and the holding clips 8 slidably housed therein. This way, when the paint pail 100 with the inventive lid 2 is placed in a paint shaker, the clamping force of the paint shaker is borne by the crush preventers 62, 62A, and not by the clip holders 50 and clips 8, thereby preventing deformation or other potential damage to the clips 8 and their clip holders 50. In the illustrated embodiment, each catch shoulder 46 may have a raised rib 65 thereon at or adjacent the overhanging inner end of the catch shoulder 46. The top of this raised rib 65 is coplanar with the tops of the crush preventers 62, 62 so that the clamping force exerted by the paint shaker applies downforce to the overhanging part of the catch shoulder 46, thereby contributing to holding of the cover 6 in its closed position abutted against the topside of the center wall 18 of the mounting base 4.

The cover 6 comprises a flat bottom disc 66 that is of circular shape and embodies a flat planar bottom of the cover 6, and whose diameter is slightly lesser than the diameter of the center wall 18 of the mounting base 4, the latter of which also denotes inside diameter of the inside wall 44 of the mounting rim 12. The bottom disc 66 of the cover can thus be seated flush against the topside of the center wall 18 of the mounting base 4 within the circular area 14 bound the outer mounting rim 12. When so seated, the disc 66 covers, in entirety, the large opening 16 and all of the strainer holes 22 in the center wall 18 of the mounting base 4. Such flush seated placement of the bottom disc 66 of the cover 6 atop the center wall 18 of the mounting base 4 thus denotes a closed position of the cover 6 that effectively closes off the top end of the paint pail 100 and prevents any admission or evacuation of paint or other substances into or out of the paint pail 100. The thickness of the bottom disc 66 is less than a standing height of the inside wall 44 of the outer mounting rim 12 from the topside of the center wall 18 of the mounting base 4, whereby the bottom disc 66 of the cover 6 resides in recessed relation to the topside 40A of the outer mounting rim 12 when the bottom disc 66 is seated flush against the center wall 18.

The cover 6 further includes an upstanding cylindrical wall 68 that stands vertically upward from a topside of the flat bottom disc 66 at the outer perimeter thereof. The height this wall 68, when measured from the flat underside of the bottom disc 66 so as to include the thickness of the bottom disc 66, is equal to the sum of the standing height of the inside wall 44 of the outer mounting rim 12 plus the height of the crush preventers 62, 62A. Thus, when the bottom disc 66 of the cover 6 is seated flush against the center wall 18 of the mounting base 4, the top of the cylindrical wall 68 of the cover 6 resides coplanar with the tops of the crush preventers 62, 62A, whereby the clamping force applied by the paint shaker is partially exerted on the cylindrical wall 68 of the cover 6, and thereby contributes to holding of the cover 6 in its closed position during the paint shaking operation. The cylindrical wall 68 also serves as a stop to limit the radially inward sliding of the holding clips 8 when the cover is in place, and thus prevents the male snap tang 54A of each holding clip 8 from overshooting the female snap slot 54 in the mounting rim during user-manipulation of the holding clip into its holding position. The cylindrical wall 68 also imparts a cup-shape to the lid, and being of a solid unperforated character, helps optimize the vacuum-retention of the cover 6 by certain types of vacuum palletizers or similar vacuum-based lifting equipment during lifting of a lidded pail by such equipment.

In the illustrated embodiment, the lid 6 features an integrally defined flexible sealing fin 70 situated on an exterior of the cylindrical wall 68 near the bottom end thereof to make sealing contact with the inside surface of the inside wall 44 of the mounting rim 12 of the mounting base 4 around a full inner circumference thereof. In other embodiments, such integrally molded sealing fin 70 could alternatively be replaced with another sealing means, for example an o-ring fitted externally around the cylindrical wall 68 of the cover 6 near the bottom thereof, for example in a circumferential groove provided therein for reliable seating of such o-ring. In either scenario, a fluid-tight seal is achieved around the outside of the cover 6 and the inside of the mounting rim 12, so that in the closed position of the cover 6, the contents of the pail 100 are stored in air-tight fashion for optimal preservation, and are also protected by liquid-tight leakage/spillage prevention.

Also on the exterior of the cylindrical wall 68 of the cover, at an intermediate elevation thereon between the sealing fin 70 and the top end of the cylindrical wall 68, the cover 6 features an annular outer shoulder 72 that spans around a full circumference of the cylindrical wall 68 and projects a short distance radially outward therefrom. The outside diameter of the cover 6 at this annular outer shoulder 72 is thus greater than the outside diameter of the bottom disc 66, and roughly equal or slightly less than the inside diameter of the inside wall 44 of the outer mounting rim 12 of the mounting base 4. The elevation and thickness of the outer shoulder 72 are chosen such that the topside of the outer shoulder 72 resides approximately coplanar with the topside 40A of the top wall 40 of the outer mounting rim 12 of the mounting base 4 when the bottom disc 66 of the cover 6 is seated firmly against the center wall 18 of the mounting base 4.

The topside of this annular outer shoulder 72 that defines the outermost perimeter of the cover thus defines an annular outermost margin of the cover 6 that, at the insertion side of the mounting base 4, can be tilted down into the undercut cavities 48 of the undercut regions of the mounting rim 12 during insertion of the cover 6 into the circular area of the mounting base 4. After such tilted insertion of one end of the cover far enough into the undercut cavities 48 that the outer shoulder 72 at the opposing end of the cover 6 clears the inside wall 44 of the mounting rim 12 at the opposing locking side of the mounting base 4, the cover 6 can be laid flat atop the center wall 18 of the mounting base. This state is shown in FIGS. 6 and 7, the latter of which shows the outer shoulder 72 of the cover 6 occupying the top end of one of the undercut cavities 48 immediately beneath the overhang of the respective catch shoulder 46, with the result the overhanging catch shoulder thus blocks lifting of this end of the of the cover 6 from off the mounting base 4. Meanwhile, at the locking side of the mounting base 4 shown in FIG. 7, each holding clip is slid into its holding position, in which it sits atop the outer shoulder 72 of the cover 66 and thus holds the bottom disc 66 of the cover 6 firmly atop the center wall 18 of the mounting base 4. The top outer corner of the outer shoulder 72 is preferably rounded or beveled, so that the holding clips 8, when pushed inwardly into their holding positions, will ride smoothly over this rounded or beveled outer corner of the outer shoulder 72 of the cover 6, and also urge the cover 6 into firm abutment with the center wall 18 of the mounting base 4.

The stop shoulders 46 and the undercut cavities 48 formed thereby at the insertion side of the mounting base 4, and the holding clips 8 deployed into their holding positions at the locking side of the mounting base 4, thus collectively block any lifting or separation of the closed cover 6 out of its abutted contact with the center wall 18 of the mounting base 4. By imparting such held retention of the cover 6 at several distributed locations around the full circumference of the mounting rim 12, notable resistance to lifting of the cover 6 is imparted, whereby a vacuum palletizer can be used to pick up a filled paint pail 100 via engagement of its vacuum gripper with the closed cover 6 of the inventive lid, without fear of gravitationally induced separation of the mated mounting base 4 and cover 6 under the weight of the paint-filled pail 100.

On the other hand, to enable easy user-removal of the cover 6 once the holding clips 8 are retracted outwardly into their release positions withdrawn from off the outer shoulder 72 of the cover 6, the cover 6 preferably includes a pull tab 74 or similarly grippable handle thereon at a position radiating outward from the cylindrical wall 68 at a greater elevation thereon than the outer shoulder 72. Positioned this way, the pull tab 74 can reside in elevated relation to the topside 40A of the mounting rim 12 in the closed position of the cover 6, at any exposed area thereof unoccupied by the crush preventers 62, 62A and the clip holders 50, so as to be in non-interfering relationship thereto. The pull tab 74 preferably sits at a spaced distance above the topside 40A of the mounting rim so that a user's finger can reach under the pull tab for easy gripping and lifting thereof during removal of the unlocked cover 6 once released from the locked hold of the holding clips 8.

Figure 4:
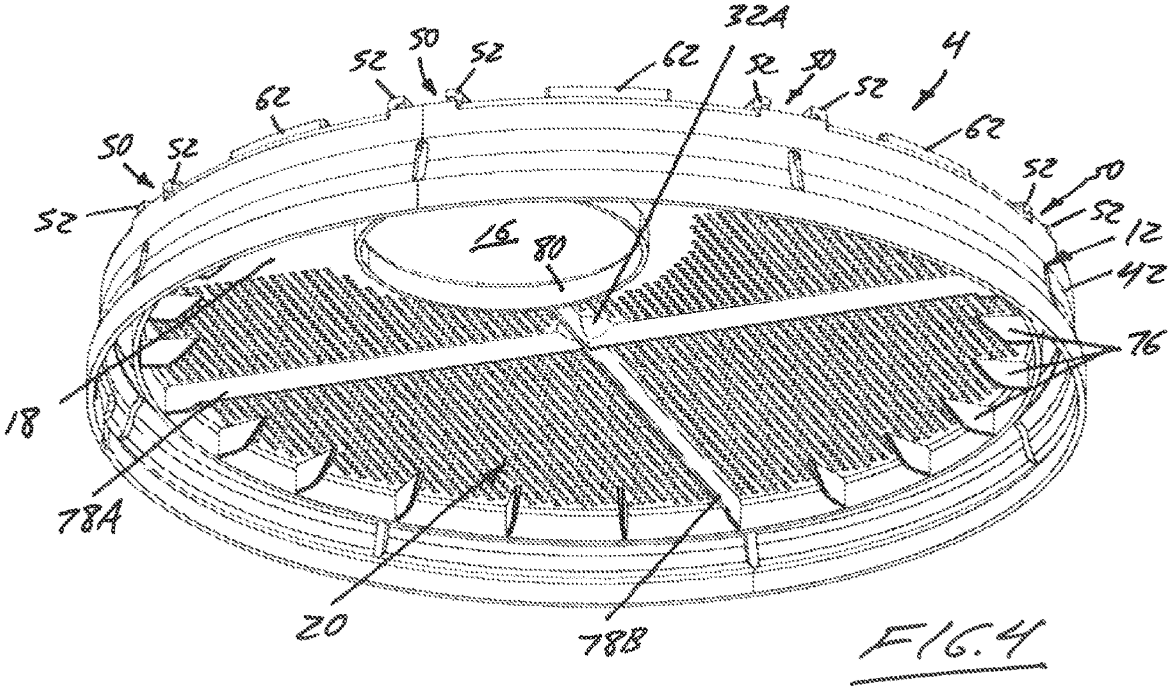
FIG. 4 is a bottom perspective view of the mounting base of FIG. 3, again in isolation.
Figure 8:
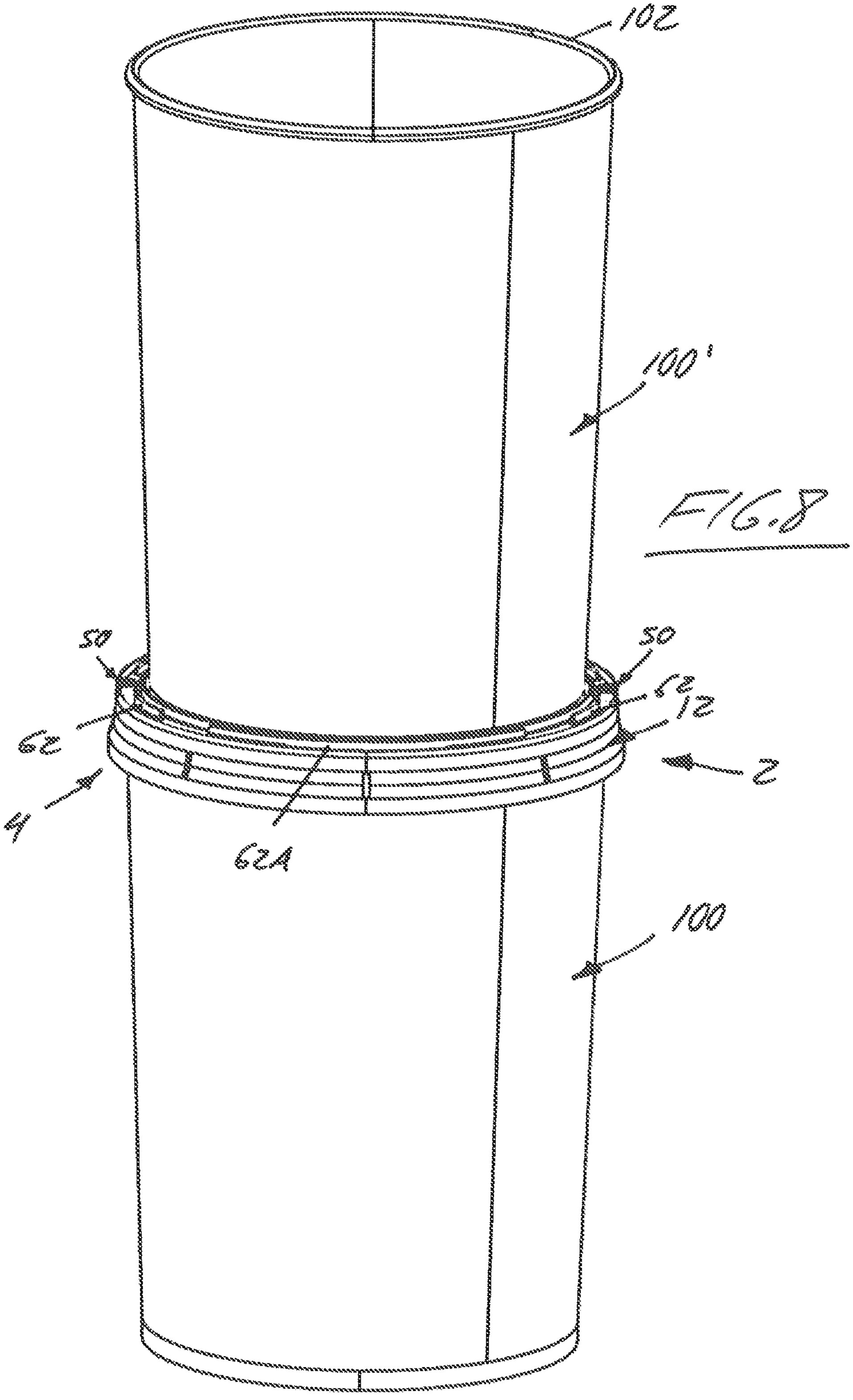
FIG. 8 is a perspective view illustrating stacking of a second paint pail atop the lidded paint pail of FIG. 1.

Referring to the revealed underside of the mounting base in FIG. 4, strength and rigidity is imparted to the center wall 18 of the mounting base 4 in part by a series of gusset-like braces 76 protruding inwardly from the inside wall 44 of the mounting rim 12 at spaced intervals therearound in fixed relation to both the inside wall 44 and the underside of the center wall 18, for example being integrally formed with both thereof in the plastic molded embodiment represented in the drawings. With reference to FIG. 8, where a second pail 100' is stacked atop the first pail in a nested position seating the bottom of the second pail 100' atop the closed cover 6 of the first pail 100 in the recessed circular area 14 of the mounting base 4, it will be appreciated that these braces 76 particularly impart extra weight-bearing capability to the center wall 18 of the mounting base at an outer margin thereof where the outer rim of the second pail's bottom end is seated in this nested stacking of the pails.

Further rigidity and strength are imparted to the center wall 18 of the mounting base 4 of the illustrated embodiment by inclusion of a pair of stiffening ribs 78A, 78B running diametrically of the center wall 18 and perpendicularly to one another, and intersecting one another at the center point of the center wall 18. At this center point, the recessed dimple 32 in the topside of the center wall forms a convexly bulbous protrusion 32A at the underside of the center wall 18 at a junction of the intersecting stiffening ribs 78A, 78B. Stiffening rib 78A spans the full diameter of the center wall 18 in underlying relation to the unperforated diametric strip 28 of the strainer 20, while stiffening rib 78B is shorter and spans from a down-turned cylindrical boundary wall 80 of the large opening 16 and across the strainer 20 to the inside wall 44 of the mounting rim 12, specifically at a location underlying the unperforated radial strip 26 of the strainer 20.

The unperforated character of these strips 26, 28 at the topside of the center wall 18 is thus attributable to the integrally molded presence of the reinforcement ribs 78A, 78B at the underside of the center wall 18. Across the large opening 16 from the shorter stiffening rib 78B, a corresponding one of the braces 76 aligned with that stiffening rib 78B preferably spans from the inside wall 44 of the mounting rim 12 to the downturned boundary wall 80 of the large opening 16, and is integrally affixed to both thereof in the unitarily molded embodiment. The quantity, positions and orientations of the stiffening ribs 78A, 78B at the underside of the center wall 18, and thus also the quantity, positions and orientations of the correspondingly unperforated strips 26, 28 at the topside of the center wall 18 at the otherwise perforated integral strainer 20 thereof, may vary from the illustrated embodiment. The inclusion of stiffening ribs 78A, 78B in the molded product design can also be exploited in design of the mold to help promote even material distribution throughout to prevent void creation during the molding process.

In terms of distribution and installation of the multi-piece in a typical implementation thereof, the molded mounting base 4, molded cover 6 and molded holding clips 8 can be transported from their manufacturer to a paint manufacturer, whether in unassembled or pre-assembled condition, and with multiple assembled lids 2, or at least the mounting bases of unassembled lids, stacked in nested relation atop one another for space efficient transport. Since the removable cover, when installed on a mounting base, is nested inside the recessed circular area of the mounting base, and the clips, when in their holding positions, have no external protrusion from the mounting rim, nested stacking of partially or fully preassembled lids is possible, and may be preferable for optimal space efficiency in transport. The paint manufacture installs each lid 2 on a respective paint pail, preferably after filling thereof with an untinted base paint, though paint could optionally be added to a pail with a pre-installed lid, via unlocking and removal of the cover 6 and pouring of paint into the pail through the large opening 16. However, any such filling of the pail through a pre-installed mounting base should not be done through the strainer thereof, where paint residue could be left behind atop the strainer, and become trapped under the cover 6 once put back into its closed position and locked therein by the holding clips 8, creating a risk of such residue paint skinning overtop of the strainer holes 22.

The filled paint pails of base paint are then distributed to retailers, whether directly or through an intermediary (wholesaler, distributer, etc.), which retailers, prior to customer delivery of the paint, tint the paint for the customer. To do so, a retailer retracts the holding clips 8 to their release positions, removes the cover 6, and adds tint to the base paint through the large opening 16, and again, not through the closely spaced straining holes 22 for the same reasons mentioned above. The cover 6 is then returned to its closed position, locked therein by the holding clips 8, and the securely closed pail then placed in a paint shaker to perform mixing of the now-tinted paint. After customer possession, and once it's time to paint, the painter moves the holding clips 8 to their release positions, removes the cover 6, and pours the paint from the pail through the exposed strainer 20 of the mounting base 4. Alternatively, an inlet strainer of a paint sprayer can be inserted into the pail through the large opening 16 for sprayed paint application, rather than pouring of the pain through the strainer 20. At any time during possession of a lidded pail by the paint manufacturer, retailer, intermediary or customer, the lidded pail, with its removable cover locked in the closed position by the holding clips, may be vacuum-lifted by a vacuum palletizer or other vacuum-equipped lifter by its locked cover 6, owing to the robust securement of the cover in it closed position by the undercuts and locking clips.

Since various modifications can be made in my invention as herein above described, and many apparently widely different embodiments of same made, it is intended that all matter contained in the accompanying specification shall be interpreted as illustrative only and not in a limiting sense.

The invention claimed is:

1. A multi-piece lid device for a pail-shaped container, said device comprising:

a mounting base for securement to the pail-shaped container at a top rim thereof, said mounting base comprising an outer mounting rim of downwardly-opening channel-shaped configuration for mated fitting over said top rim of the paint container, said outer mounting rim spanning around a recessed center wall of the mounting base that is of recessed elevation relative to a topside of said outer rim;

at least one opening that penetrates through said recessed center wall and through which a pourable medium is introducible into, or pourable from, the pail-type container in an installed state of the mounting base thereon;

a removable cover embodied separately of the mounting base and selectively engageable thereto in a closed position seated atop the recessed center wall in closed relation over the at least open opening therein, and removable from the mounting base to re-open said at least one opening; and at least one movable cover holder on the mounting base that is movable between a holding position for holding the removable cover in the closed position, and a release position permitting removal of the removable cover, wherein said at least one movable cover holder is further characterized by at least one of the following:

(a) said at least one movable cover holder comprises a plurality of movable cover holders distributed at spaced intervals from one another around an outermost perimeter of the removable cover, each of which juts inwardly over the outermost perimeter of the removable cover in the holding position, but is retracted outwardly beyond the outermost perimeter of the removable cover in the release position;

(b) said at least one movable cover holder is slidably engaged to the mounting base for sliding movement relative thereto in an inward direction ultimately achieving the holding position, by jutting inwardly over the outermost perimeter of the removable cover, and opposingly in an outward direction ultimately achieving the release position, retracted outwardly beyond the outermost perimeter of the removable cover;

(c) said at least one movable cover holder is resides atop the outer mounting rim; and (d) said at least one movable cover holder comprises a movable holding clip having a first snap feature thereon that, in the holding position, engages with a second snap feature on the mounting rim to hold the movable cover holder in the holding position.

2. The device of claim 1 wherein said at least one movable cover holder is characterized by at least (c).

3. The device of claim 2 wherein the mounting base comprises one or more raised crush preventers thereon of greater elevation than the at least one movable cover holder to prevent damage thereto.

4. The device of claim 3 wherein said at least one cover holder is further characterized by (a), and at least one of the one or more raised crush preventers resides between an adjacent pair of the plurality of movable cover holders.

5. The device of claim 1 wherein said at least one movable cover holder is characterized by at least (a).

6. The device of claim 5 wherein said plurality of cover holders are interconnected.

7. The device of claim 1 wherein said at least one movable cover holder is characterized by at least (d).

8. The device of claim 7 wherein said first and second snap features comprise a protrusive male snap feature on a first one of either the movable cover holder or the mounting base, and a cooperatively female snap feature on a second one of either the movable cover or the mounting base.

9. The device of claim 8 wherein the protrusive male snap feature resides on an underside of the movable cover holder, and the female snap features is recessed in a topside of the mounting base.

10. The device of claim 1 wherein the least one hole in the recessed center wall of the mounting base comprises an array of straining holes distributed throughout at least part of the center wall to define a strainer through which the pourable medium is strainable during pouring thereof from the pail-shaped container through said straining holes when the removable cover is removed.

11. A multi-piece lid device for a pail-shaped container, said device comprising:

a mounting base for securement to the pail-shaped container at a top rim thereof, said mounting base comprising an outer mounting rim of downwardly-opening channel-shaped configuration for mated fitting over said top rim of the paint container, said outer mounting rim spanning around a recessed center wall of the mounting base that is of recessed elevation relative to a topside of said outer rim;

at least one opening that penetrates through said recessed center wall and through which a pourable medium is introducible into, or pourable from, the pail-type container in an installed state of the mounting base thereon; and a removable cover embodied separately of the mounting base and selectively engageable thereto in a closed position seated atop the recessed center wall in closed relation over the at least open opening therein, and removable from the mounting base to re-open said at least one opening;

wherein:

the least one hole in the recessed center wall of the mounting base comprises an array of straining holes distributed throughout at least part of the center wall to define a strainer through which the pourable medium is strainable during pouring thereof from the pail-shaped container through said straining holes when the removable cover is removed;

the at least one hole further comprises an additional isolated hole of larger size than the straining holes that is offset from the array of straining holes at a spaced distance therefrom of greater measure than a hole diameter of the straining holes, said isolated hole being unaccompanied by any additional holes of said larger size; and the removable cover is configured to cover, in the closed position thereof, both said array of straining holes and said additional isolated hole of said larger size.

12. The device of claim 1 wherein the removable cover comprises an upstanding cylindrical wall at a topside thereof that spans circumferentially around the removable cover in proximity to an outermost perimeter thereof, but offset a short distance inwardly from said outermost perimeter to leave an outer peripheral margin of the removable cover exposed outside said upstanding cylindrical wall, and the at least one movable cover holder, in the holding position thereof, engages over said outer peripheral margin of the removable cover from the outermost perimeter thereof, and said upstanding cylindrical wall stands taller from the mounting base than the at least movable cover holder and imposes a physical stop limit on permitted inward movement thereof from the outermost perimeter of the removable cover.

13. A multi-piece lid device for a pail-shaped container, said device comprising:

a mounting base for securement to the pail-shaped container at a top rim thereof, said mounting base comprising an outer mounting rim of downwardly-opening channel-shaped configuration for mated fitting over said top rim of the paint container, said outer mounting rim spanning around a recessed center wall of the mounting base that is of recessed elevation relative to a topside of said outer rim;

at least one opening that penetrates through said recessed center wall and through which a pourable medium is introducible into, or pourable from, the pail-type container in an installed state of the mounting base thereon;

a removable cover embodied separately of the mounting base and selectively engageable thereto in a closed position seated atop the recessed center wall in closed relation over the at least open opening therein, and removable from the mounting base to re-open said at least one opening; and at least one movable cover holder on the mounting base that is movable between a holding position jutting inwardly over an outermost perimeter of the removable cover to hold the removable cover in the closed position, and a release position retracted outwardly beyond the outermost perimeter;

wherein the removable cover comprises an upstanding cylindrical wall at a topside thereof that spans circumferentially around the removable cover in proximity to the outermost perimeter thereof, but offset a short distance inwardly from said outermost perimeter to leave an outer peripheral margin of the removable cover exposed outside said upstanding cylindrical wall, and the at least one movable cover holder, in the holding position thereof, engages over said outer peripheral margin of the removable cover from the outermost perimeter thereof, and said upstanding cylindrical wall stands taller from the mounting base than the at least movable cover holder.

14. The device of claim 1 wherein the at least one movable cover holder is characterized by at least (b).

15. The device of claim 1 wherein the at least one movable cover holder is characterized by at least (a) and (b).

16. The device of claim 1 wherein the at least one movable cover holder is characterized by at least (a) and (c).

17. The device of claim 1 wherein the at least one movable cover holder is characterized by at least (b) and (c).

18. The device of claim 1 wherein the at least one movable cover holder is characterized by at least (b) and (d).

19. The device of claim 1 wherein the at least one movable cover holder is characterized by at least (c) and (d).

20. The device of claim 1 wherein the at least one movable cover holder is characterized by at least (a), (b) and (c).

21. The device of claim 1 wherein the at least one movable cover holder is characterized by at least (a), (b) and (d).

22. The device of claim 1 wherein the at least one movable cover holder is characterized by at least (a), (c) and (d).

23. The device of claim 1 wherein the at least one movable cover holder is characterized by at least (b), (c) and (d).

24. The device of claim 1 wherein the at least one movable cover holder is characterized by all of (a), (b), (c) and (d).

* * * * *